United States Patent [19]

Mundhenke

[11] Patent Number: 4,810,742
[45] Date of Patent: Mar. 7, 1989

[54] UV STABLE, IMPACT RESISTANT, FLAME RETARDED ABS COMPOSITION CONTAINING ALIPHATIC RESIN

[75] Inventor: Rudolph F. Mundhenke, North Tonawanda, N.Y.

[73] Assignee: Occidental Chemical Corporation, Niagara Falls, N.Y.

[21] Appl. No.: 151,214

[22] Filed: Feb. 1, 1988

[51] Int. Cl.$^4$ .............................................. C08K 5/02
[52] U.S. Cl. .................................. 524/411; 524/377; 524/380; 524/467
[58] Field of Search ............... 524/411, 412, 482, 490, 524/491, 380, 377, 265, 266, 269, 375, 322, 313, 141, 462, 463, 106, 467; 525/70, 86

[56] References Cited

U.S. PATENT DOCUMENTS

| | | | |
|---|---|---|---|
| 2,720,495 | 11/1955 | Phreaner | 524/269 |
| 3,074,900 | 1/1963 | Wasserman | 524/375 |
| 3,354,108 | 11/1967 | Paradis et al. | 524/377 |
| 3,403,036 | 8/1968 | Hindersinn et al. | 524/467 |
| 3,438,971 | 4/1969 | Walker | 525/86 |
| 3,506,740 | 4/1970 | Dempsey et al. | 525/86 |
| 3,575,944 | 4/1971 | Stroh | 524/141 |
| 3,576,923 | 2/1978 | Randell et al. | 524/141 |
| 3,730,929 | 5/1973 | Breza | 524/467 |
| 3,796,677 | 3/1974 | Laber et al. | 525/87 |
| 3,888,941 | 6/1975 | Weaver | 525/86 |
| 3,957,909 | 5/1976 | Perron et al. | 525/86 |
| 4,116,702 | 9/1978 | Rohringer et al. | 524/375 |
| 4,169,869 | 10/1979 | Milenius | 525/87 |
| 4,174,325 | 11/1979 | Pischtschan et al. | 524/313 |
| 4,203,931 | 5/1980 | Lee | 524/411 |
| 4,228,119 | 10/1980 | Gomez et al. | 524/322 |
| 4,374,223 | 2/1983 | Raamsdonk | 524/462 |
| 4,386,182 | 5/1983 | Zijp | 524/375 |
| 4,390,652 | 6/1983 | Isley | 524/322 |
| 4,560,719 | 12/1985 | Nakamura et al. | 524/269 |
| 4,703,083 | 10/1987 | Giori et al. | 525/86 |

FOREIGN PATENT DOCUMENTS 58-89641  5/1983  Japan.

OTHER PUBLICATIONS

Tabor et al., "Decabromodiphenyl Oxide"-a New Fine Retardant Additive for Plastics 1974, Intl. Symposium on Flammability and Fire Retardants (Techromic Pub. Co.) pp. 162-178.
Chang et al., J. Applied Polymer Sci., vol. 21, 2167-2180 (1977).

Primary Examiner—Veronica P. Hoke

[57] ABSTRACT

UV stable, impact resistant, flame retarded thermoplastic compositions are obtained by compounding ABS with aliphatic resin, Diels-Alder adduct of 2 moles of chlorocyclopentadiene and 1 mole of cyclooctadiene (commonly known as Dech Plus), antimony oxide and optionally with nitrile rubber and/or surfactant. Such compositions consist essentially by weight of from about 0.5 to about 10% of aliphatic resin, from 0% to about 5% nitrile rubber, from 0% to about 5% surfactant, from about 14% to about 30% Dech Plus, from about 4% to about 20% antimony oxide and from about 50% to about 80% ABS. The ABS constituent has an Izod Impact Strength of at least 1.5 foot-pounds per inch; the amounts of said aliphatic resin, said nitrile rubber and said surfactant being such as to provide an Izod Impact Strength in foot-pounds per inch of notch determined by ASTM D-256, of at least 2.0 in the thermoplastic composition. The compositions have Izod Impact Strengths ranging from up to 4 foot-pounds per inch and in most cases a V-O (UL94) flammability classification.

17 Claims, No Drawings

UV STABLE, IMPACT RESISTANT, FLAME RETARDED ABS COMPOSITION CONTAINING ALIPHATIC RESIN

TECHNICAL FIELD

This invention is directed to novel impact resistant, flame retarded ABS compositions which are especially useful for providing housings for electronic apparatus such as typewriter casings and business machine housings (e.g. computer housings).

BACKGROUND OF THE INVENTION

Flame retarded housing for electronic apparatus are normally considered a necessity by electronic apparatus manufacturers to protect against the risk of liability should a fire occur. To meet this need, housings have been fabricated from ABS compositions incorporating brominated fire retardancy additives such as octabromodiphenyl oxide, decabromodiphenyl oxide and bis(tribromophenoxy)ethane, usually in combination with antimony oxide. These brominated additives are not generally considered UV stable, and compositions containing UV unstable additives, when exposed to fluorescent light or other source of ultraviolet radiation, yellow to an undesirable degree. The conventional brominated additives also are disadvantageous in forming dioxin (which is considered to be hazardous) when they burn and in lowering the heat distortion temperature of ABS.

Diels-Alder adduct of 2 moles of chlorocyclopentadiene and 1 mole of cyclooctadiene, a commercially available flame retarder for use in polymers, has been added in small amounts to ABS in substitution for conventional brominated additives in Japan but the product obtained does not have the highest flammability rating and has poor impact strength.

It is an object herein to provide a UV stable, flame retarded ABS composition suitable for use for housings for electronic apparatus or other analogous use.

As used herein, the term "UV stable" means an increase in Yellowness Index of less than 10 between original and seven day readings in testing according to ASTM Procedure No. 1925.

As used herein, the term "impact resistant" means an Izod Impact Strength in foot-pounds per inch of notch as determined on ⅛ inch samples by ASTM Test D256, of at least 2.0.

As used herein the term "flame retarded" means a flammability classification of V-1 or V-0 as determined in Underwriters Laboratories Inc. Test UL94 (third edition) on ⅛" samples.

SUMMARY OF THE INVENTION

It has been discovered herein that the above object is realized and additionally advantages are provided of no risk of dioxin formation, no blooming even at 80° C., and good elongation properties, by incorporating with ABS an additive combination of aliphatic resin, Diels-Alder adduct of 2 moles of chlorocyclopentadiene and 1 mole of cyclooctadiene (hereinafter sometimes referred to as "said Diels-Alder adduct"), and antimony oxide, and optionally also of nitrile rubber and/or surfactant. Use instead of additive consisting only of said Diels-Alder adduct and antimony oxide results in the Izod Impact Strength in foot-pounds per inch of notch determined by ASTM D-256 below 2.0 whereby there is unacceptable risk of breakage when articles fabricated of the composition are subjected to impact forces.

In particular, the compositions of the present invention are UV stable, impact resistant, flame retarded thermoplastic compositions which consist essentially by weight of (a) from about 0.5% to about 10% aliphatic resin of average molecular weight (i.e., number average molecular weight as determined by gel permeation chromatography) less than 2000 (b) from 0% to about 5% nitrile rubber, (c) from about 0% to about 5% surfactant, (d) from about 14% to about 30% of said Diels-Alder adduct, (e) from about 4% to about 20% antimony oxide and (f) from about 50% to about 80% acrylonitrile-butadiene-styrene copolymer having an Izod Impact Strength in foot-pounds per inch of notch determined on ⅛ inch samples according to ASTM Test D-256, of at least 1.5; the amounts of said aliphatic resin, said nitrile rubber and said surfactant being such as to provide an Izod Impact Strength in foot-pounds per inch of notch determined on ⅛ inch samples according to ASTM Test D-256, of at least 2.0 in the thermoplastic compositions.

DETAILED DESCRIPTION

The compositions herein preferably consist essentially by weight of from about 0.5% to about 5% of said aliphatic resin, from 0% to about 4% nitrile rubber, from about 0% to about 2% surfactant, from about 15% to about 20% of said Diels-Alder adduct, from about 5.5% to about 7% antimony oxide, and from about 67% to about 77% of said acrylonitrile-butadiene-styrene copolymer.

When the composition does not contain any nitrile rubber or surfactant, the aliphatic resin normally should be present in an amount of at least about 2% by weight and preferably in an amount ranging from about 2% to about 4% by weight.

When the composition contains aliphatic resin and nitrile rubber but no surfactant, the aliphatic resin preferably is present in an amount ranging from about 1% to about 3% by weight and the nitrile rubber is preferably present in an amount ranging from about 2% to about 4% by weight.

When the composition contains aliphatic resin and surfactant but not nitrile rubber, the aliphatic resin preferably is present in an amount ranging from about 1% to about 3% by weight and the surfactant is preferably present in an amount ranging from about 0.5% to about 2% by weight.

When the composition contains aliphatic resin and both nitrile rubber and surfactant, the aliphatic resin is preferably present in an amount ranging from about 0.5% to about 1.5% by weight, the nitrile rubber is preferably present in an amount ranging from about 0.5% to about 1.5% by weight and the surfactant is preferably present in an amount ranging from about 0.5% to about 1.5% by weight.

Turning now to the aliphatic resin ingredient, the term "aliphatic" is used in "aliphatic resin" in a broad sense as encompassing resins not only with acyclic content but also those with alicyclic content and those that are aromatically modified (e.g. that include a minor amount of aromatic units such as styrene units). The aliphatic resins herein include hydrocarbon resins which are described, for example, as being of the cyclopentadiene type, as being olefinic resins or as being derived from mixed olefins and as being aliphatic hydrocarbon resins. The aliphatic resins herein also include those described as aliphatic resins even though they are not described as being hydrocarbon resins. Aliphatic resins for use herein are readily available commercially. Suitable commercially available aliphatic resins include, for example, those available under the designations LX-973 Resin (Neville Chemical Company), NEVTAC 100 Resin (Neville Chemical Company), WINGTACK 10 (The Goodyear Tire & Rubber Company), WINGTACK 95 (The Goodyear Tire & Rubber Company), WINGTACK PLUS (The Goodyear Tire & Rubber Company), WINGTACK EXTRA (The Goodyear Tire & Rubber Company), BETAPRENE BC-100 (Reichhold Chemicals, Inc.), BETAPRENE BR-100 (Reichhold Chemicals, Inc.), STA-TAC T (Reichhold Chemicals, Inc.), RESINALL 762 (Resinall Corp.), RESINALL 764 (Resinall Corp.), RESIN 140 (Texmark Resins, Inc.), PICCOTAC 95 (Hercules Incorporated), PICCOTAC B (Hercules Incorporated) and Struktol TR 060 (Struktol Company). LX-973 Resin is described by the manufacturer as a petroleum hydrocarbon resin-cyclopentadiene type, as having a softening point (Ring & Ball) of 100° C. (as determined by ASTM Test Method E28), as having a specific gravity at 25° C. of 1.09 (ASTM Test Method D-71, as having an Iodine Number (Wijs) of 160 (ASTM Test Method D-1959), as having a Flash Point (COC) of 450° F. (ASTM Test D-92) and as having a number average molecular weight of 630 (ASTM Test D-2503). NEVTAC 100 is described by the manufacturer as being a synthetic polyterpene hydrocarbon resin, as having a softening point (Ring & Ball ) of 102° C. (ASTM Test Method E 28), a specific gravity at 25° C. of 0.960 (ASTM Test Method D-71), an Iodine Number (Wijs) of 145 (ASTM Test Method D-1959), a flash point (COC) of 450° C., and as having a number average molecular weight of 1280 (ASTM Test Method D-2503). WINGTACK 10 is described by the manufacturer as being a synthetic polyterpene resin, as having a softening point (Ring & Ball) of 10° C., a specific gravity at 25° C. of 0.88, a Brookfield Viscosity at 25° C. of 20,000 to 40,000 cps (ASTM Test Method E-338), a flash point of 308° F., an Iodine Number of 100, an Acid Number of 0.18, a pH of 7 and a number average molecular weight of 450. WINGTACK 95 is described by the manufacturer as a C5 synthetic polyterpene resin, as having a softening point (Ring & Ball) of 98° C. (ASTM Test Method E 28), a specific gravity at 25° C. of 0.93, a flash point (COC) of 480, an Acid Number of 1.0, an Iodine Number of 30, and a number average molecular weight of 1200. WINGTACK PLUS is described by the manufacturer as an aromatically modified petroleum hydrocarbon resin and as a modified polyterpene type hydrocarbon resin, as having a softening point (Ring & Ball) of 93° to 100° C. (ASTM Test Method D 28), a specific gravity of 0.93, an Acid Number of 1.0 and a number average molecular weight of 1100; other literature indicates that it is very similar to WINGTACK 95 except that it contains a minor amount of styrene units. WINGTACK EXTRA is described by the manufacturer as a modified polyterpene type hydrocarbon resin and as having a softening point (Ring & Ball) of 94° to 100° C. (ASTM Test Method E 28), a specific gravity at 25° C. at 0.96, an Acid Number of less than 1.0 and a molecular weight of 1400. BETAPRENE BC-100 is described by the manufacturer as being an olefinic hydrocarbon polymer and as having a softening point (Ring & Ball) of 95°–105° C. and a viscosity (Gardner-Holdt at 70% in toluene) of K-0, and as being soluble in aliphatic solvents, aromatic solvents and chlorinated solvents. BETAPRENE BR-100 is described by the manufacturer as being a polyolefin hydrocarbon resin and as having a softening point (Ring & Ball) of 97°–103° C., a viscosity (Gardner-Holdt, at 70% in toluene) of 0-V and as being soluble in aliphatic solvents, aromatic solvents, and chlorinated solvents, and as being insoluble in alcohols, esters and ketones. STA-TAC T is described by the manufacturer as being a thermoplastic hydrocarbon resin derived from the polymerization of mixed olefins and as being developed to meet the requirements of polyterpenes, and as having a softening point (Ball & Ring) of 100° C. to 105° C., a specific gravity at 77° F. of 0.92 to 0.95, a viscosity (Gardner, 70% in toluene) of L-Q and as being soluble in aliphatic solvents, aromatic solvents and chlorinated solvents and as being insoluble in alcohols, esters and ketones. RESINALL 762 is described by the manufacturer as being a hydrocarbon petroleum resin and as an aliphatic hydrocarbon resin made from petroleum derived monomers and as possessing a high degree of unsaturation and as having a melting point (Ring & Ball) of 115° C. to 125° C., a specific gravity at 25° C. of 1.092, a flash point (COC) of 215° C., a viscosity (Gardner, 70% toluene, 25° C.) of R-X, an Iodine Number of 145 and as being soluble in aromatic, aliphatic and chlorinated hydrocarbons and as being insoluble in alcohols, acetone, glycols and water. RESINOL 764 is described by the manufacturer as a hydrocarbon petroleum resin and as an aliphatic hydrocarbon resin made from petroleum-derived monomers and as being chemically inert and possessing a high degree of unsaturation and as having a melting point (Ring & Ball) of 135° C. to 145° C., a specific gravity at 25° C. of 1.092, a flash point (COC) of 251° C., a viscosity (Gardner, 70% toluene, 25° C.) of X-Z1, an Acid Number less than 1, an Iodine Number of 130, and as being soluble in aromatic, aliphatic and chlorinated hydrocarbons and as being insoluble in alcohols, glycols, acetone and water. RESIN 140 is described by manufacturers as a petroleum hydrocarbon resin having a melting point of 140° C., a specific gravity at 25° C. of 1.03, a vapor pressure at 77° F. of less than 0.1 mm Hg., a boiling point greater than 500° F., a flash point (COC) of 525° F. an Iodine No. (0.10 g) of 154 and as being of negligible solubility in water. PICCOTAC 95 is described by the manufacturer as being an aliphatic hydrocarbon resin and as having a softening point (Ring & Ball) of 91° C. to 97° C., a specific gravity at 25° C. of 0.950, a flash point (COC) at 555° F., an acid number of less than 1, a viscosity (70% resin solids in toluene) at 25° C. of 2.9 stokes, a gel permeation chromatography weight average molecular weight of 1,550, a gel permeation chromatography number average molecular weight of 875, a melt viscosity (10 poises) of 155° C., a melt viscosity (100 poises) of 125° C. and a melt viscosity (1,000 poises) of 110° C. and as having negligible solubility in water. PICCOTAC B is described by the manufacturer as being an aliphatic hydrocarbon resin largely derived from mixed monomers of petroleum origin, as having a softening point (Ring & Ball) 98° C. to 102° C., a specific gravity at 25° C. of 0.948, a flash point (COC) of 560° F., an acid number of less than 1, a viscosity (70% resin solids in toluene) at 25° C. of 3.9 stokes, a gel permeation chromatography weight average molecular weight of 1,895, a gel permeation chromatography number average molecular weight of 1,025, a melt viscosity (10 poises) of 160° C., a melt viscosity (100 poises) of 160° C. and a melt viscosity (1,000 poises) of 110° C. and as having negligible solubility in water. Struktol TR 060 is described by the manufacturer as being a mixture of aliphatic resins with a molecular weight less than 2000 and as having a softening point (ring/ball method) of 102° C., a density of 0.95, a flash point of greater than 230° C. and as having good solubility in aliphatic, aromatic, and chlorinated hydrocarbons; NMR analysis indicates that it is a hydrocarbon resin.

Turning now to the nitrile rubber ingredient, it preferably is acrylonitrile-butadiene copolymer having an acrylonitrile content, on a weight percentage basis based on the total weight of acrylonitrile and butadiene used to form the copolymer, ranging from about 15% to about 50%, and a butadiene content, on a weight percentage basis based on the total weight of acrylonitrile and butadiene used to form the copolymer, ranging from about 85% to about 50%. Very preferably, it is acrylonitrile-butadiene copolymer having an acrylonitrile content, on a weight percentage basis based on the total weight of acrylinitrile and butadiene used to form the copolymer, ranging from about 17% to about 35%, and a butadiene content, on a weight percentage basis based on the total weight of acrylonitrile and butadiene used to form the copolymer, of about 83% to about 65%. Such ingredient is readily formulated into the composition herein utilizing either a chunky form or a granular form. Suitable nitrile rubbers for use herein are readily available commercially. For example, a preferred nitrile rubber for use herein is sold as Polymer 053 by Scientific Polymer Products, Inc. of Ontario, N.Y.; it is available in slab or chunk form and has an acrylonitrile content of 19–22% on a weight basis and a Mooney viscosity (ML-4@212° F.) of 65–85 and a density of 0.98 and is soluble in methyl ethyl ketone. Another nitrile rubber for use herein is sold under the designation Chemigum P83 by Goodyear Chemical; it is sold in granular form and has an acrylonitrile content on a weight basis of 33%. Another nitrile rubber useful herein is sold under the designation N984B by Goodyear; it is described as having an acrylonitrile content of 19–22%. Still another nitrile rubber useful herein is sold under the designation P715-C1 by Goodyear; it is described as having an acrylonitrile content of 27%.

Turning now to the surfactant ingredient, it can be, for example, a nonionic, anionic or cationic surfactant and can have, for example, an HLB ranging from 1 to 20 and is, for example, selected from the group consisting of polysiloxanes, siloxane-oxyalkylene copolymers, phosphate esters, fatty monoglycerides, alcohol ethoxylates, alkyl phenol ethoxylates, polyglycol esters, fatty acids, fluorochemical surfactants and pyrrolidone surfactants.

Preferred polysiloxanes are polydimethylsiloxanes and have kinematic viscosities at 25° C. ranging, for example, from 0.65 mm²/s to 100000 m²/s. Such components are sold under the name Silicone Fluids AK by by Wacker-Chemie GmbH of Munich, Germany; these generally have surface tensions less than 22 mN/m at 25° C. indicating high surface activity. A very suitable product which is described by the manufacturer (Air Products & Chemicals, Inc. of Allentown, PA) as a polysiloxane is supplied under the designation XF-B41-57 and is described as having a boiling point at atmospheric pressure of greater than 300° F., a vapor pressure at 77° F. of less than 5 mm Hg, a solubility in water of less than 0.1% and a flash point (closed cup) of 127° F.

Siloxane-oxyalkylene copolymers useful as surfactant ingredient can have, for example, the general formula I:

$$R_a SiY_{4-a} \qquad \text{I}$$

wherein a is 0 or an integer from 1 to about 3, R is a alkyl group containing from 1 to about 30 carbon atoms, or a group of formula II:

$$R'(OR')_b OR'' \qquad \text{II}$$

wherein R' is alkylene group containing from 1 to about 6 carbon atoms, b has a value of from 1 to about 100, preferably from 10 to 30; and R" is a capping group which can be selected from hydrogen, alkyl, acyl, aryl, alkaryl, aralkyl or alkenyl groups containing up to about 20 carbon atoms, sulfate, sulfonate, phosphate, carboxylate, phosphonate, borate or isocyanate groups, or mixtures thereof; Y is a group having the formula III:

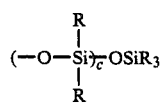

wherein R is as defined above and c has a value from 1 to about 200; and wherein at least one R group in the compound has the formula II. In said formula II, the same chain can contain the same or different oxyalkylene groups.

Other siloxane-oxyalkylene copolymers useful as surfactant ingredient include, for example, those with Si—O—C bonds, such as those having the general formula

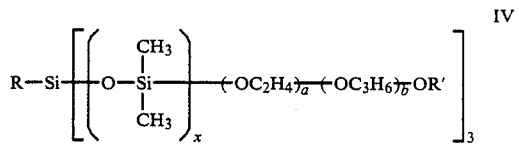

wherein x ranges from 1 to about 200, a plus b has a value of from 2 to about 100 and R and R' are lower alkyl, i.e., alkyl with from 1 to 3 carbon atoms.

Siloxane-oxyalkylene copolymers for use as surfactant ingredient herein are readily available commercially. One such siloxane-oxyalkylene copolymer is available under the designation Byk-S 732 from BYK-Chemie USA of Wallingford, CT. Byk-S 732 is described by the manufacturer as a polyether modified methylalkyl polysiloxane copolymer, as having a specific gravity of 0.93, as having a flash point of 144° and as being insoluble in water.

Phosphate ester surfactants useful herein are readily available commercially and are described as free acid of complex organic phosphate ester and are anionic surfactants. Phosphate esters of this type are readily available commercially, for example, from GAF Corporation under the designations GAFAC RE-610 and GAFAC RS-710. GAFAC RE-610 is described by the manufacturer as polyoxyethylene nonylphenyl ether phosphate and as having a boiling point of greater than 235.85° C., a specific gravity at 25° C. of 1.10 to 1.12, an Acid Number (titration with NaOH to first inflection point) of 62 to 72, a pH (10% solution) of 1.5 to 2.5, a flash point of 440° F., a viscosity at 50° C. (Ostwald-Fenske of 610 to 630 cks, as having a surface tension in distilled water at 25° C. in dynes/cm of 35 at 1.0%, 37 at 0.1%, 37 at 0.01% and 48 at 0.001% and as being soluble at 25° C. in water, acetone, ethanol and xylene. GAFAC RS-710 is described by the manufacturer as having an aliphatic hydrophobic base, a specific gravity at 25° C. of 1.04 to 1.06, an Acid Number (titration with NaOH to first inflection point) of 60 to 70, a pH (10% solution) of 1.5 to 2.5, a flash point of greater than 300° F., and as being soluble at 25° C. in water, acetone, ethanol and xylene.

The fatty monoglyceride surfactants contain, for example, fatty acid ester group with 8 to 20 carbon atoms. These are commercially available, for example, from Eastman Chemical Products, Inc. under the designation Myverol Distilled Monoglycerides, e.g. Myverol 18-06 and Myverol 18-92. Myverol 18-06 Distilled Monoglyceride is indicated by the manufacturer as having a melting point of about 69° C., a boiling point of about 460° C., a specific gravity at 25° C. of 1.02, a flash point of 227° C. and as having negligible solubility in water. Myverol 18-92 Distilled Monoglyceride is indicated by the manufacturer as having a melting point of about 41° C., a specific gravity at 80° C. of 0.95, a flash point of 230° C. and as having negligible solubility in water.

The alcohol ethoxylate surfactants contain, for example, alcohol moiety with 6 to 20 carbon atoms and contain from 2 to 20 moles of ethylene oxide. These are commercially available, for example, under the designations ETHONIC 1214-2 and ETHONIC 1214-3 from Ethyl Corporation and under the designation Genapol T-250 from American Hoechst Corporation. ETHONIC 1214-2 is described by the manufacturer as having alcohol moiety derived from a mixture of linear $C_{12}$, $C_{14}$ and $C_{16}$ alcohols and as containing a hydrophilic end containing an average of 2 moles of ethylene oxide and as having an HLB of 6.2, a boiling point of 255° C., a pour point of 10° C., a specific gravity (20° C./20° C.) of 0.906, a cloud point determined by ASTM D-2024 of 19.6 ml$H_2O$, a flash point (PMCC) of 310° F., a hydroxyl value (mg KOH/g) of 196, an average molecular weight of 286 g/mole and an ethylene oxide content of 31 weight percent. ETHONIC 1214-3 is described by the manufacturer as being derived from a mixture of linear $C_{12}$ and $C_{14}$ alcohols and as containing a hydrophilic end containing an average of 3 moles of ethylene oxide and as having HLB of 8.0, a pour point of 5° C., an average molecular weight of 330, a hydroxyl value of 165–175 mg KOH/g, a cloud point determined by ASTM D-2024 of 47.0 ml$H_2O$, a specific gravity (20° C./20° C.) of 0.931, a flash point (PMCC) of 305° F. and an ethylene oxide content of 40 weight percent. Genapol T-250 is described by the manufacturer as an alkylpolyglycol ether wherein the hydrophobic portion has an average chain length of $C_{16}$-$C_{18}$ and as having an HLB of 16, a melting point of 45° C. to 50° C., a specific gravity (50° C.) of 1.02, a cloud point of 77° C. to 79° C., a flash point of 270° C., a viscosity at 70° C. of 44 cps, and a solubility in water of 200° C. of 10%.

The alkyl phenol ethoxylates contain, for example, alkyl moiety of 6 to 20 carbon atoms and are ethoxylated with, for example 2 to 20 moles of ethylene oxide. These are readily available commercially, for example, under the designations SURFONIC N-95 and SURFONIC N-150 from Texaco Inc., under the designations TRYCOL 6940 and TRYCOL 6964 (TRYCOL NP-9) from Emery Chemicals and under the designation STEROX DF Surfactant from Monsanto Company. SURFONIC N-95 is described by the manufacturer as poly(oxy-1,2-ethanediyl,alpha-(nonylphenyl)-omega-hydroxy-, as containing an average of 9.5 moles per mole of ethylene oxide, and as having an HLB of 12.9, a specific gravity (20° C./20° C.) of 1.061, a refractive index at 20° C. of 1.4893, a freezing point of 5° C., a flash point (PMCC) of 460° F., a theoretical molecular weight of 632, a cloud point of 54° C. in 1% aqueous, a viscosity (SUS) of 68 at 210° F. and 510 at 100° F., a surface tension (0.1%, 25° C.) of 30.8 dynes/cm and as being soluble in water. SURFONIC N-150 is described by the manufacturer as poly(oxy-1,2-ethanediyl),alpha(-nonylphenyl)-omega-hydroxy-, as containing an average of 15 moles per mole of ethylene oxide, as having an HLB of 15.0, a specific gravity (30/4° C.) of 1.065, a refractive index at 30° C. of 1.4815, a freezing point of 23° C., a flash point (PMCC) of 335° F., a theoretical molecular weight of 880, a cloud point (1% aqueous) of 94° C., a viscosity (SUS) of 89 at 210° F., a surface tension (0.1%, 25° C.) of 34.2 and as being soluble in water. TRYCOL 6940 is described by the manufacturer as polyoxyethylene (5) nonyl phenol ether and as having a specific gravity at 25° C. of 1.024, a flash point (COC) of 500° F., and a hydroxyl value of 123 to 133. TRYCOL 6964 is described by the manufacturer as polyoxyethylene (9.2) nonyl phenol ether, and as having an HLB of 12.9, a specific gravity of 1.055 at 25° C., a flash point (COC) of 535° F., a viscosity at 25° C. of 256 cstk, and a cloud point (1% in distilled water) of 52° C. to 56° C. STEROX DF is described by the manufacturer as having a $C_{12}$ alkyl substituent and as being ethoxylated with 5 to 6 moles of ethylene oxide and as haviong a hydroxyl number of 102 to 111, and as being a yellow viscous liquid above 40° C. and a stable gel below 40° C.

The polyglycol ester surfactants are those, for example, which contain 8–20 carbon atoms in the acid moiety and a polyglycol moiety derived from 2 to 20 moles of ethylene glycol. These are readily available commercially, for example under the designation WITCONOL H-31A from Witco Chemicals. WITCONOL H-31A is described by the manufacturer as PEG-8 oleate and as polyethylene glycol monooleate and as having an Acid Number of 7, a flash point (PMCC) of greater than 93° C., a specific gravity (25/4° C.) of 0.99 and a viscosity (SUS) at 100° F. of greater than 100.

The fatty acid surfactants are those, for example, containing 8 to 20 carbon atoms. These are readily available commercially, for example, from Arizona Chemical Company under the designation ACTINOL FA-2 TALL OIL FATTY ACID. ACTINOL FA-2 is described by the manufacturer as containing 97.8% fatty acids (37% non-conjugated linoleic, 7% conjugated linoleic, 50% oleic, 2% saturated fatty acids, 4% other fatty acids) and as having a specific gravity (25° C./25° C.) of 0.898, a viscosity (Gardner-Holdt, 25° C.) of A, a viscosity at 25° C. of 20 cps, a flash point (open cup) of 200° F., an acid value of 197, a saponification value of 199, a boiling point greater than 500° F., an Iodine Value (Wijs) of 130 and as having negligible solubility in water.

The fluorocarbon surfactants include, for example, fluoroaliphatic polymeric esters and ethyoxylated fluorocarbons. These are readily available commercially, for example, from 3M under the designation Fluorad FC-740 and Fluorad FC-741 and from Dupont under the designations ZONYL FSO Fluorosurfactant and ZONYL FSN Fluorosurfactant. Fluorad FC-740 is described by the manufacturer as a fluoroaliphatic polymeric ester, as fluorinated alkyl ester, as being of the nonionic type, and as having a specific gravity at 25° C. of about 1, a flash point (Setaflash Closed Cup) of 56° C., a pour point of about 10° F., a viscosity at 25° C. typically of 150 cps, and a boiling point of approximately 370° F. Fluorad FC-741 is described by the manufacturer as being of the class of fluoroaliphatic polymeric esters, as being of the nonionic type, and as having a specific gravity of approximately 1.1 at 25° C., a flash point (Setaflash Closed Cup) of more than 200° F., a pour point of 2° to 5° C., a viscosity at 25° C. of 33 cps and a boiling point of approximately 68° C. and as having excellent solubility in aromatic and chlorinated solvents. ZONYL FSO Fluorosurfactant is described by the manufacturer as being within the general structure $F(CF_2CF_2)_{3-8}CH_2CH_2O(CH_2CH_2O)_xH$, as being of the nonionoc type, as having a boiling point of 100° C., a specific gravity of 1.3, a flash point (PMCC) greater than 105° C. and an aqueous surface tension (25° C., dynes/cm) of 19 at 0.01% solids and also at 0.1% solids. ZONYL FSN is described the manufacturer as being within the same general formula as ZONYL FSO, as being of the nonionic type, as having a density at 25° C. of 1.06 g/ml, as having a flash point (Pensky Martens Closed Tester) of 22° C. and as having an aqueous surface tension (25° C., dynes/cm) of 24 as 0.01% solids and 23 at 0.10% solids.

The pyrrolidone surfactants useful herein are, for example, N-(n-alkyl)-2-pyrrolidones (e.g. with alkyl ranging from 6 to 20 carbon atoms). These are readily available commercially, for example under the designation SURFADONE LP-100 SURFACTANT from GAF Corporation. SURFADONE LP-100 SURFACTANT is described by the manufacturer as N-(n-octyl)-2-pyrrolidone and as having a boiling point of 100° C., a specific gravity at 25° C. of 0.92 and a flash point (TCC) of 246.00° F.

We turn now to the said Diels-Alder adduct ingredient; it is also known as 1,2,3,4,7,8,9,10,13,13,14,14-dodecachloro-1,4,4a,5,6,6a,7,10,10a,11,12,12a-dodecahydro-1,4:7,10-dimethanodibenzo(a,e)cyclooctene, and as 1,4,7,10-dimethanocyclooctal,2,3,4,7,8,9,10,13,13,14,14-dodecachloro-1,4,4a,5,6-,6a,7,10,10a,11,12,12a-dodecahydro[1,2,5,6]-dibenzene. Its preparation is disclosed by Ziegler et al, Annalen der Chemie, 1954, vol. 589, pp 157–162; Call No. QD1.L7. It has the structural formula

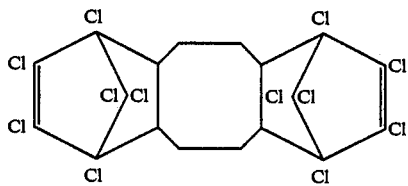

It has been assigned CAS Number 13560-89-9. It is described as a fire retardant for polymeric materials in Hindersinn et al U.S. Pat. No. 3,403,036. It is commonly known as Dech Plus, and it is available commercially from Occidental Chemical Corporation under the designation DECHLORANE PLUS. It is sold in powder form under the designation Dechlorane Plus 1000 and in granular form under the designation Dechlorane Plus 25. It is described by the manufacturer as having a melting point of 350° C. (with decomposition), a density of 1.8 g/cc, and a vapor pressure at 200° C. of 0.006 mm of Hg.

We turn now to the antimony oxide ingredient. It preferably is antimony trioxide which has the formula $Sb_2O_3$. Antimony trioxide is readily commercially available from M & T Chemicals Inc. of Rahway, N.J.

We turn now to the acrylonitrile-butadiene-styrene copolymer ingredient; this is commonly known as ABS or ABS plastic. Preferably, this ingredient has an Izod Impact Strength in foot-pounds per inch of notch determined on ⅛ inch samples by ASTM Test D-256 ranging from 4 to 12. This ingredient is readily prepared by polymerizing styrene and acrylonitrile in the presence of butadiene polymer(polybutadiene) using from about 10% to about 30% by weight acrylonitrile, from about 5% to about 60% by weight polybutadiene and from about 85% to about 10% by weight styrene, the weight percentages of acrylonitrile, polybutadiene and styrene being based on the total weight of acrylonitrile, polybutadiene and styrene; such polymerizing is readily carried out by known polymerization techniques including solution, bulk, emulsion and suspension polymerization techniques and the product formed while normally including both graft copolymer formed by graft polymerizing styrene and acrylonitrile onto polybutadiene and also copolymer of styrene and acrylonitrile, is designated acrylonitrile-butadiene-styrene copolymer or alternatively terpolymer of acrylonitrile, butadiene and styrene. The polybutadiene for use as described above is readily formed by polymerizing butadiene at a temperature below 60° C., for example, using bulk, solution or emulsion techniques. Suitable processes for preparing acrylonitrile-butadiene-styrene copolymer ingredient for use herein are described, for example, in Fremon et al U.S. Pat. No. 3,168,593 and Calvert U.S. Pat. No. 3,238,275 and Papetti U.S. Pat. No. 4,046,839. Acrylonitrile-butadiene-styrene copolymer ingredient for use herein is readily available commercially under the designation Cycolac L from Borg-Warner Corporation. Cyclolac L is described by the manufacturer as having an Izod Impact Strength in foot-pounds per inch of notch (⅛″ bar) as determined by ASTM Test D-256, method A, of 7.5 at 73° F., a tensile strength (Type 1, ⅛ inch thickness) at 73° F. of 5,000 psi as determined by the ASTM Test D-638 (0.2 inch/min), a tensile modulus (Type 1, ⅛″ thickness) at 73° F. of 2.6 psi × 10⁵ as determined by ASTM Test D-638 (0.2 inch/minute), a flexural yield strength (⅛ inch × ½ inch × 4 inch bar) of 8500 psi at 73° F., of 4300 psi at 160° F. and at 12,100 psi at −40° F., as determined by ASTM Test D-790 (0.05 inch/minute), a flexural modulus (⅛ inch × ½ inch × 4 inch bar) of 2.7 psi × 10⁵ at 73° F., of 1.6 psi × 10⁵ at 160° F. and of 2.8 psi × 10⁵ at −40° F. as determined by ASTM Test D-790 (0.05 inch/minute), and a Rockwell R hardness of 90 at 73° F., as determined by ASTM D-785, all the samples tested being injection molded specimens. Compression-molded specimens of Cyclolac L were described by the manufacturer as having a coefficent of thermal expansion of 6.1 in/in/°F. (×10⁻⁵) as determined by ASTM Test D-696, a deflection temperature (on a ½ inch × ½ inch × 5 inch unannealed bar) at 264 psi of 188° F. at 10 mils deflection and at 66 psi of 208° F. at 10 mils deflection as determined by ASTM Test D-648 and a deflection temperature (on a ½ inch × ½ inch × 5 inch annealed bar) at 264 psi of 210° F. at 10 mils deflection and at 66 psi of 219° F. at 10 mils deflection as determined by ASTM Test D-648. Cyclolac L is further described by the manufacturer as having a specific gravity of 1.02 for injection molded specimens (as determined by ASTM Test D-792 Method A) and a flammability for compression-molded specimens of 1.4 in/min as determined by ASTM Test D-635. A very preferred acrylonitrile-butadiene-styrene copolymer ingredient is sold by Borg-Warner Corporation under the designation Cycolac L 1000; it has been measured to have an Izod Impact Strength of 9.6–10.2 foot-pounds per inch of notch (⅛" bar) as determined by ASTM Test D-256.

The compositions of the present invention are readily formulated by compounding preferably using a temperature of 190° C. to 270° C. While the term melt blending can be used to describe the formulating, it is should be noted that neither the Dech Plus nor the antimony oxide are melted at the temperatures preferably utilized. The compounding is readily carried out utilizing a Farrel Mill for small batches and an extruder for large batches. The ingredients may be premixed for feeding to the compounding apparatus or may be fed thereto in succession. In a preferred commercial method, the ABS is melted in an extruder and the other ingredients are fed into the extruder downstream into the melted ABS.

The compositions herein can optionally contain compatible colorants, pigments, dyes, processing aids (e.g. lubricants to aid in extruding) and thermostabilizers, in conventional amounts.

The compositions herein are UV stable in that they normally exhibit an increase in Yellowness Index between initial and seven day readings determined in accordance with ASTM Procedure No. 1925 of less than 7.5, are impact resistant normally having an Izod Impact Strength in foot-pounds per inch of notch as determined on a ⅛ inch bar by ASTM D-256 of 2.0 to 4, and have a flammability classification at least as high as V-1 and in most cases of V-0 (as determined by Underwriters Laboratories Inc. Test UL94 (3rd edition) on ⅛ inch thick specimens.

The invention is illustrated in the specific examples which are each designated "EXAMPLE" hereinafter, and comparison of compositions which depart from the invention is illustrated in the specific examples which are designated hereinafter as "REFERENCE EXAMPLE". In the Examples and Reference Examples, except where otherwise stated, 1000 gram batches were prepared utlizing a Farrel Mill (with rolls heated to 200° C.) and the ingredients were added in succession with ABS being added first, then nitrile rubber (if any), then aliphatic resin, then surfactant (if any), than an admixture of Dech Plus and antimony oxide.

In the Examples and Reference Examples, Izod Impact Strengths were determined on ⅛ inch bars in foot-pounds per inch of notch by ASTM Test D-256, flammability classification was determined in accordance with UL94, third edition, of Underwriters Laboratories Inc. on ⅛ inch samples, and Yellowness Index was determined in accordance with ASTM Procedure No. 1925.

The tradenames used below have been explained above and the compositions represented by such have been described above insofar as information is available.

We turn now to the specific Examples and Reference Examples.

EXAMPLE I

A composition was formulated containing by weight 74% Cycolac L1000, 3.0% Struktol TR 060, 16.9% Dechlorane Plus 1000 and 6.1% antimony trioxide. It was determined to have an Izod Impact Strength of 2.48 foot-pounds per inch and a flammability classification of V-0.

REFERENCE EXAMPLE 1

In six cases compositions were formulated containing 77% Cycolac L1000, 16.9% Dechlorane Plus 1000 and 6.1% antimony trioxide. The compositions were determined to have Izod Strengths ranging from 1.4 to 1.5 foot-pounds per inch and flammability classifications in five cases of V-0 and in one case of V-1.

REFERENCE EXAMPLE 2

A composition was formulated containing weight 75.4% Cycolac L1000, 17% Dechlorane Plus 25, 6.1% antimony trioxide and 1.5% Struktol TR 060. It was determined to have an Izod Impact Strength of 1.4 foot-pounds per inch.

EXAMPLE II

Three batches of a composition were formulated containing by weight 74.5% Cycolac L1000, 1.5% Struktol TR 060 aliphatic resin, 1% XF-B41-57 surfactant, 16.9% Dechlorane Plus 1000 and 6.1% antimony trioxide. It was determined to have an Izod Impact Strength of 2.7 foot-pounds per inch in two cases and 2.8 foot-pounds per inch in the third case, a flammability classification of V-0 in all three cases, a Yellowness Index originally of 28.3 and a Yellowness Index at seven days of 30.2 in one case and a Yellowness Index originally of 30.9 and a Yellowness Index at seven days of 32.7 in a second case. (Yellowness readings were determined only on two batches.)

REFERENCE EXAMPLE 3

A composition was made up as in Example II except that it contained an equal weight of Dechlorane Plus 25 in place of the Dechlorane Plus 1000. It was determined to have an Izod Impact Strength of 1.8 foot-pounds per inch and a flammability classification of V-0.

REFERENCE EXAMPLE 4

A composition was formulated containing by weight 69% Cycolac L1000, 1.5% Struktol TR 060, 1% XF-B41-57 surfactant, 21% Dechlorane Plus 1000 and 8% antimony trioxide. It was determined to have an Izod Impact Strength of 1.6 foot-pounds per inch and a flammability classification of V-0.

REFERENCE EXAMPLE 5

A composition was formulated containing by weight 63.8% Cycolac L1000, 1.5% Struktol TR 060, 1% XF-B41-57 surfactant, 24.7% Dechlorane Plus 1000, and 9% antimony trioxide. It was determined to have an Izod Impact Strength of 1.0 foot-pounds per inch and a flammability classification of V-0.

REFERENCE EXAMPLE 6

A composition was formulated as in Example II except that it contained 77% by weight Cycolac-L1000 and no Struktol TR 060 and no XF-B41-57. It was determined to have an Izod Impact Strength of 1.6 foot-pounds per inch and a flammability classification of V-0.

EXAMPLE III

A composition formulates as in Example II except that the surfactant was Byk-S732 in place of XF-B41-57.

It was determined to have an Izod Impact Strength of 2.5 foot-pounds per inch and a flammability classification of V-0.

EXAMPLE IV

A composition was formulated as in Example II except that the surfactant was GAFAC RE-610. It was determined to have an Izod Impact Strength of 2.4 foot-pounds per inch and a flammability classification of V-0.

EXAMPLE V

A composition was formulated as in Example II except that the surfactant was GAFAC RS-710. It was determined to have an Izod Impact Strength of 2.1 foot-pounds per inch and a flammability classification of V-1.

EXAMPLE VI

A composition was formulated as in Example II except that the surfactant was MYVEROL 18-06. It was determined to have an Izod Impact Strength of 2.4 foot-pounds per inch and a flammability classification of V-1.

EXAMPLE VII

A composition was formulated as in Example II except that the surfactant was MYVEROL 18-92. It was determined to have an Izod Impact Strength of 2.3 foot-pounds per inch and a flammability classification of V-0.

EXAMPLE VIII

A composition was formulated as in Example II except that the surfactant was ETHONIC 1214-2. It was determined to have an Izod Impact Strength of 2.6 foot-pounds per inch and a flammability classification of V-0.

EXAMPLE IX

A composition was formulated as in Example II except that the surfactant was ETHONIC 1214-3. It was determined to have an Izod Impact Strength of 2.5 foot-pounds per inch and a flammability classification of V-0.

EXAMPLE X

A composition was formulated as in Example II except that the surfactant was Genapol T-250. It was determined to have an Izod Impact Strength of 2.5 foot-pounds per inch and a flammability classification of V-0.

EXAMPLE XI

A composition was formulated as in Example II except that the surfactant was SURFONIC N-95. It was determined to have an Izod Impact Strength of 2.4 foot-pounds per inch and a flammability classification of V-0.

EXAMPLE XII

A composition was formulated as in Example II except that the surfactant was SURFONIC N-150. It was determined to have an Izod Impact Strength of 2.3 foot-pounds per inch and a flammability classification of V-0.

EXAMPLE XIII

A composition was formulated as in Example II except that the surfactant was TRYCOL 6940. It was determined to have an Izod Impact Strength of 2.4 foot-pounds per inch and a flammability classification of V-0.

EXAMPLE XIV

A composition was formulated as in Example II except that the surfactant was TRYCOL 6964. It was determined to have an Izod Impact Strength of 2.3 foot-pounds per inch and a flammability classification of V-0.

EXAMPLE XV

A composition was formulated as in Example II except that the surfactant was STEROX DF. It was determined to have an Izod Impact Strength of 2.2 foot-pounds per inch and a flammability classification of V-0.

EXAMPLE XVI

A composition was formulated as in Example II except that the surfactant was WITCONOL H-31A. It was determined to have an Izod Impact Strength of 2.5 foot-pounds per inch and a flammability classification of V-0.

EXAMPLE XVII

A composition was formulated as in Example II except that the surfactant was ACTINOL FA-2. It was determined to have an Izod Impact Strength of 2.6 foot-pounds per inch and a flammability classification of V-0.

EXAMPLE XVIII

A composition was formulated as in Example II except that the surfactant was FLUORAD FC-740. It was determined to have an Izod Impact Strength of 2.4 foot-pounds per inch and a flammability classification of V-0.

EXAMPLE XIX

A composition was formulated as in Example II except that the surfactant was FLUORAD FC-741. It was determined to have an Izod Impact Strength of 2.6 foot-pounds per inch and a flammability classification of V-0.

EXAMPLE XX

A composition wass formulated as in Example II except that the surfactant was Zonyl fso fluorosurfactant. It was determined to have an Izod Impact Strength of 2.5 foot-pounds per inch and a flammability classification of V-0.

EXAMPLE XXI

A composition was formulated as in Example II except that the surfactant was ZONYL FSN FLUOROSURFACTANT. It was determined to have an Izod Impact Strength of 2.5 foot-pounds per inch and a flammability classification of V-0.

EXAMPLE XXII

A composition was formulated as in Example II except that the surfactant was SURFADONE LP-100 SURFACTANT. It was determined to have an Izod Impact Strength of 2.3 foot-pounds per inch and a flammability classification of V-0.

EXAMPLE XXIII

A composition was formulated the same as in Example II except that an equal weight of WINGTACK 10 was used in place of Struktol TR 060 for the aliphatic resin ingredient. It was determined to have an Izod Impact Strength of 2.2 foot-pounds per inch and a flammability classification of V-0.

EXAMPLE XXIV

A composition was formulated the same as in Example II except that the aliphatic resin was WINGTACK 95. It was determined to have an Izod Impact Strength of 2.4 foot-pounds per inch and a flammability classification of V-0.

EXAMPLE XXV

A composition was formulated the same as in Example II except that the aliphatic resin was WINGTACK PLUS. It was determined to have an Izod Impact Strength of 2.4 foot-pounds per inch and a flammability classification of V-0.

EXAMPLE XXVI

A composition was formulated the same as in the Example II except that the aliphatic resin was WINGTACK EXTRA. It was determined to have an Izod Impact Strength of 2.4 foot-pounds per inch and a flammability classification of V-0.

EXAMPLE XXVII

A composition was formulated the same as in Example II except that the aliphatic resin was BETAPRENE BC-100. It was determined to have an Izod Impact Strength of 2.3 foot-pounds per inch and a flammability classification of V-0.

EXAMPLE XXVIII

A composition was formulated the same as in Example II except that the aliphatic resin was BETAPRENE BR-100. It was determined to have an Izod Impact Strength of 2.3 foot-pounds per inch and a flammability classification of V-0.

EXAMPLE XXIX

A composition was formulated the same as in Example II except that the aliphatic resin ingredient was STA-TAC T. It was determined to have an Izod Impact Strength of 2.4 foot-pounds per inch and a flammability classification of V-0.

EXAMPLE XXX

A composition was formulated the same as in Example II except that the aliphatic ingredient was RESINALL 762. It was determined to have an Izod Impact Strength of 2.3 foot-pounds per inch and a flammability classification of V-0.

EXAMPLE XXXI

A composition was formulated the same as in Example II except that the aliphatic resin ingredient was RESINALL 764. It was determined to have an Izod Impact Strength of 2.3 foot-pounds per inch and a flammability classification of V-0.

EXAMPLE XXXII

A composition was formulated the same as in Example II except that the aliphatic resin ingredient was RESIN 140. It was determined to have an Izod Impact Strength of 2.5 foot-pounds per inch and a flammability classification of V-0.

EXAMPLE XXXIII

A composition was formulated as in Example II except that the aliphatic resin ingredient was PICCOTAC 95. It was determined to have an Izod Impact Strength of 2.37 foot-pounds per inch and a flammability classification of V-0.

EXAMPLE XXXIV

A composition was formulated as in Example II except that the aliphatic resin ingredient was PICCOTAC B. It was determined to have an Izod Impact Strength of 2.5 foot-pounds per inch and a flammability classification of V-0.

EXAMPLE XXXV

A composition was formulated containing by weight 72.5% Cycolac L1000, 1.5% Struktol TR 060, 3% nitrile rubber (19–22% acrylonitrile content), 16.9% Dechlorane Plus 1000 and 6.1% antimony oxide. It was determined to have an Izod Impact Strength of 3.2 foot-pounds per inch, a flammability classification of V-0, a Yellowness Index originally of 27.9 and a Yellowness Index in seven days of 34.0.

EXAMPLE XXXVI

A composition was formulated as in Example XXXV except that for the aliphatic ingredient an equal weight of LX-973 resin was substituted for the Struktol TR 060. It was determined to have an Izod Impact Strength of 2.81 foot-pounds per inch and a flammability classification of V-0.

EXAMPLE XXXVII

A composition was formulated as in Example XXXV except that for the aliphatic resin ingredient NEVTAC 100 was used in place of Struktol TR 060. It was determined to have an Izod Impact Strength of 2.82 foot-pounds per inch and a flammability classification of V-0.

EXAMPLE XXXVIII

A composition was formulated containing by weight 74.0% Cycolac L1000, 1.0% Struktol TR 060, 1.0% nitrile rubber (19–22% acrylonitrile content), 1.0% XF-B41-57 surfactant, 16.9% Dechlorane Plus 1000, and 6.1% antimony trioxide. It was determined to have an Izod Impact Stength of 2.8 foot-pounds per inch, a flammability classification of V-0, a Yellowness Index originally of 27.7 and a Yellowness Index at seven days of 30.4.

REFERENCE EXAMPLE 7

Izod Impact Strength testing on Cycolac L1000 gave values in foot-pounds per inch of 9.6, 9.9, 9.9 10, 10.2 and 10.2.

Compositions of the above EXAMPLES were determined to have tensiles at yield ranging from 4554 to 5098 psi (except one composition of Example II was determined to have a tensile at yield of 4380 psi), tensiles at break ranging from 3654 to 4124 psi (except the composition of Example X was determined to have a tensile at break of 3138 psi), an elongation at yield ranging from 2.6 to 3.0%, and elongation at break ranging from 8 to 20.4% and a deflection temperature (264 psi) ranging from 77 to 84° C. Tensiles and elongations were determined by ASTM Test D-638 and deflection temperatures were determined by ASTM Test D-648.

Variations will be evident to those skilled in the art. Therefore, the scope of the invention is intended is intended to be defined by the claims.

What is claimed is:

1. A UV stable, impact resistant, flame retarded thermoplastic composition consisting essentially by weight of (1) from about 0.5% to about 10% aliphatic resin of average molecular weight less than 2000, (b) from 0% to about 5% nitrile rubber, (c) from 0% to about 5% surfactant, (d) from about 14% to about 30% Diels-Alder adduct of 2 moles of chlorocyclopentadiene and 1 mole of cyclooctadiene, (e) from about 4% to about 20% antimony oxide, and (f) from about 50% to about 80% acrylonitrile-butadiene-styrene copolymer having an Izod Impact Strength in foot-pounds per inch of notch determined by ASTM D-256 of at least 1.5; the amounts of said aliphatic resin, said nitrile rubber and said surfactant being such as to provide an Izod Impact Strength in foot-pounds per inch of notch determined by ASTM D-256, of at least 2.3 in the thermoplastic composition.

2. A composition as recited in claim 1 consisting essentially by weight of from about 0.5% to about 5% of said aliphatic resin, from 0% to about 4% nitrile rubber, from 0% to about 2% surfactant, from about 15% to about 20% Diels-Alder adduct of 2 moles of chlorocyclopentadiene and 1 mole of cyclooctadiene, from about 5.5% to about 7% antimony oxide, and from about 67% to about 77% of said acrylonitrile-butadiene-styrene copolymer.

3. A composition as recited in claim 2 wherein said aliphatic resin is present in an amount ranging from about 2% to about 4% by weight and no nitrile rubber and no surfactant are present, said aliphatic resin being a mixture of aliphatic resins having a softening point (ring/ball method) of 102° C. and a density of 0.95.

4. A composition as recited in claim 2 wherein the nitrile rubber is acrylonitrile-butadiene copolymer having an acrylonitrile content, on a weight percentage basis, ranging from about 15% to about 50%.

5. A composition as recited in claim 4 wherein the nitrile rubber is acrylonitrile-butadiene copolymer having an acrylonitrile content, on a weight percentage basis, ranging from about 17% to about 35%.

6. A composition as recited in claim 5 wherein said aliphatic resin is present in an amount ranging from about 1% to about 3% by weight and the nitrile rubber is present in an amount ranging from about 2% to about 4% by weight and no surfactant is present, thereby to provide the thermoplastic composition with an Izod Impact Strength in foot-pounds per inch of notch determined by ASTM D-256, of at least 2.8.

7. A composition as recited in claim 5 wherein said aliphatic resin is present in amount ranging from about 0.5% to about 1.5% by weight, the nitrile rubber is present in an amount ranging from about 0.5% to about 1.5% by weight, and the surfactant is present in an amount ranging from about 0.5% to about 1.5% by weight; said aliphatic resin being a mixture of aliphatic resins having a softening point (ring/ball method) of 102° C. and a density of 0.95; said surfactant being a polysiloxane; the amounts of said aliphatic resin, said nitrile rubber and said surfactant being such as to provide the thermoplastic composition with an Izod Impact Strength in foot-pounds per inch of notch determined by ASTM D-256, of at least 2.8.

8. A composition as recited in claim 2 wherein said aliphatic resin is present in an amount ranging from about 1% to about 3% by weight, the surfactant is present in an amount ranging from about 0.5% to about 2% by weight and no nitrile rubber is present; said aliphatic resin being a mixture of aliphatic resins having a softening point (ring/ball method) of 102° C. and a density of 0.95; said surfactant being a polysiloxane; thereby to provide the thermoplastic composition with an Izod Impact Strength in foot-pounds per inch of notch determined by ASTM-256, of at least 2.7.

9. A composition as recited in claim 2 wherein said aliphatic resin is a hydrocarbon resin.

10. A compositon as recited in claim 2 wherein the surfactant is selected from the group consisting of polysiloxanes, siloxane-oxyalkylene copolymers, alcohol ethoxylates, alkyl phenol ethoxylates, fatty acids, fatty monoglycerides, polyglycol esters, phosphate esters, fluorochemical surfactants and pyrrolidone surfactants.

11. A composition as recited in claim 10 wherein the surfactant is a polysiloxane.

12. A composition as recited in claim 2 wherein the acrylonitrile-butadiene-styrene copolymer has an Izod Impact Strength of foot-pounds per inch of notch determined by ASTM D-256 ranging from 4 to 12.

13. A compositon as recited in claim 12 wherein the acrylonitrile-butadiene-styrene copolymer is prepared by polymerizing styrene and acrylonitrile in the presence of a polybutadiene using from 10% to about 30% by weight of acrylonitrile, from about 5% to about 60% by weight polybutadiene and from about 85% to about 10% by weight styrene, the weight percentages of acrylonitrile, polybutadiene and styrene being based on the total weight of acrylonitrile, polybutadiene and styrene.

14. A composition as recited in claim 1, wherein the amounts of said aliphatic resin, said nitrile rubber and said surfactant are such as to provide an Izod Impact Strength in foot-pounds per inch of notch determined by ASTM D-256, of at least 2.5 in the thermoplastic composition.

15. A composition as recited in claim 6, wherein said aliphatic resin is a mixture of aliphatic resins having a softening point (ring/ball method) of 102° C. and a density of 0.95.

16. A composition as recited in claim 7 wherein said surfactant has a boiling point at atmospheric pressure of greater than 300° F., a vapor pressure at 77° F. of less than 5 mm Hg and a solubility in water of less than 0.1%.

17. A composition as recited in claim 8 wherein said surfactant has a boiling point at atmospheric pressure of greater than 300° F., a vapor pressure at 77° F. of less than 5 mm Hg and a solubility in water of less than 0.1%.

* * * * *

UNITED STATES PATENT AND TRADEMARK OFFICE
CERTIFICATE OF CORRECTION

PATENT NO. : 4,810,742

DATED : March 7, 1989

INVENTOR(S) : RUDOLPH F. MUNDHENKE

It is certified that error appears in the above-identified patent and that said Letters Patent is hereby corrected as shown below:

The following should be additionally listed on the cover page under "FOREIGN PATENT DOCUMENTS":
--1,078,088   5/80   Canada--.

The following should be additionally listed on the cover page under "OTHER PUBLICATIONS"
--Hensley, Modern Plastics Encyclopedia 1985-1986, pp. 6-7--; Plastics Compounding, September October 1980, 79-81, 86-89--; Plastics Compounding, March April 1986, 40, 42-46--; --Research Disclosure, 1982, 216, 124 # 21638, "Rubber Modified ABS Resins" (also C.A. 97: 7210e)--.

Signed and Sealed this

Nineteenth Day of September, 1989

Attest:

DONALD J. QUIGG

Attesting Officer

Commissioner of Patents and Trademarks